US010647326B2

(12) United States Patent
Goto

(10) Patent No.: US 10,647,326 B2
(45) Date of Patent: May 12, 2020

(54) DRIVING ADVICE APPARATUS AND DRIVING ADVICE METHOD

(71) Applicant: SUBARU CORPORATION, Tokyo (JP)

(72) Inventor: Ikuo Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/174,406

(22) Filed: Oct. 30, 2018

(65) Prior Publication Data

US 2019/0161088 A1 May 30, 2019

(30) Foreign Application Priority Data

Nov. 28, 2017 (JP) .................. 2017-228174

(51) Int. Cl.
| | | |
|---|---|---|
| B60Q 1/00 | (2006.01) | |
| B60W 40/09 | (2012.01) | |
| B60W 50/14 | (2020.01) | |
| G06K 9/00 | (2006.01) | |

(52) U.S. Cl.
CPC ............ *B60W 40/09* (2013.01); *B60W 50/14* (2013.01); *G06K 9/00315* (2013.01); *G06K 9/00845* (2013.01); *B60W 2050/143* (2013.01); *B60W 2050/146* (2013.01)

(58) Field of Classification Search
CPC ................. B60W 40/09; B60W 50/14; B60W 2050/143; B60W 2050/146; G06K 9/00315; G06K 9/00845
USPC ...................................................... 340/425.5
See application file for complete search history.

(56) References Cited

U.S. PATENT DOCUMENTS

| | | | |
|---|---|---|---|
| 10,322,727 B1* | 6/2019 | Chan ..................... | B60W 50/14 |
| 2008/0105482 A1* | 5/2008 | Yamaguchi ............ | G05B 15/02 |
| | | | 180/271 |
| 2011/0153532 A1* | 6/2011 | Kuge .................... | B60W 40/09 |
| | | | 706/12 |
| 2014/0212849 A1 | 7/2014 | Naiwala et al. | |
| 2015/0078632 A1 | 3/2015 | Hachisuka et al. | |
| 2016/0264131 A1* | 9/2016 | Chan .................. | B60W 30/025 |
| 2017/0030726 A1* | 2/2017 | French ............... | G01C 21/3461 |

FOREIGN PATENT DOCUMENTS

| | | |
|---|---|---|
| JP | 2006-163473 A | 6/2006 |
| JP | 2006-350567 A | 12/2006 |
| JP | 2007-148917 A | 6/2007 |
| JP | 2009-157685 A | 7/2009 |
| JP | 2013-69251 A | 4/2013 |

(Continued)

OTHER PUBLICATIONS

Japanese Office Action for Application No. 2017-228174 dated Jul. 16, 2019.

*Primary Examiner* — Naomi J Small
(74) *Attorney, Agent, or Firm* — Troutman Sanders LLP

(57) ABSTRACT

A driving advice apparatus includes: an operation determiner; and an advice generator. The operation determiner uses a difference between an emotion of a driver and an emotion of a passenger to determine a specific driving operation of the driver. The advice generator generates an advice for the driver about the specific driving operation on a basis of a difference between a driving feature of the driver and a driving feature of the passenger.

18 Claims, 3 Drawing Sheets

(56) References Cited

FOREIGN PATENT DOCUMENTS

| JP | 2013-216241 A | 10/2013 |
| JP | 2016-137871 A | 8/2016 |
| JP | 2017-109635 A | 6/2017 |
| JP | 2017-111760 A | 6/2017 |

* cited by examiner

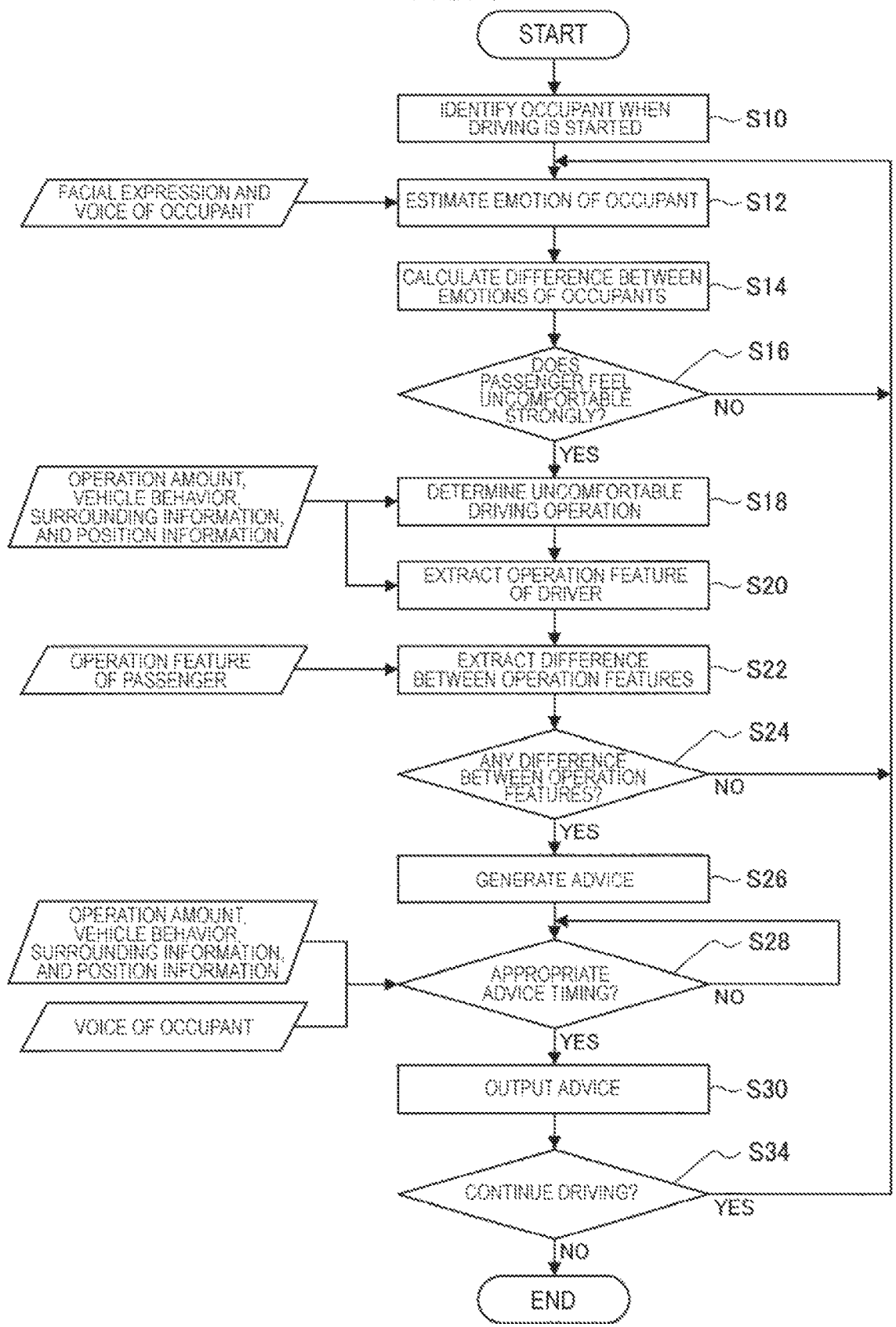

US 10,647,326 B2

DRIVING ADVICE APPARATUS AND DRIVING ADVICE METHOD

CROSS-REFERENCE TO RELATED APPLICATIONS

The present application claims priority from Japanese Patent Application No. 2017-228174 filed on Nov. 28, 2017, the entire contents of which are hereby incorporated by reference.

BACKGROUND

1. Technical Field

The present invention relates to a driving advice apparatus and a driving advice method.

2. Related Art

Conventionally, Japanese Unexamined Patent Application Publication (JP-A) No. 2009-157685, JP-A No. 2013-69251, and JP-A No. 2006-350567 have proposed an apparatus that extracts a driving feature of a driver of a vehicle, and advises the driver on the basis of a result of comparison with a driving feature of another driver or a safe driving model created from a driving feature of another driver.

In addition, JP-A No. 2016-137871 proposes an apparatus that estimates emotions of a driver and a passenger from biological information and image information, and performs various kinds of control on a vehicle side to make an improvement when those emotions are negative.

SUMMARY OF THE INVENTION

An aspect of the present invention provides a driving advice apparatus including: an operation determiner configured to use a difference between an emotion of a driver and an emotion of a passenger to determine a specific driving operation of the driver; and an advice generator configured to generate an advice for the driver about the specific driving operation on a basis of a difference between a driving feature of the driver and a driving feature of the passenger.

Another aspect of the present invention provides a driving advice method including: using a difference between an emotion of a driver and an emotion of a passenger to determine a specific driving operation of the driver; and generating an advice for the driver about the specific driving operation on a basis of a difference between a driving feature of the driver and a driving feature of the passenger.

An aspect of the present invention provides a driving advice apparatus including circuitry configured to use a difference between an emotion of a driver and an emotion of a passenger to determine a specific driving operation of the driver; and generate an advice for the driver about the specific driving operation on a basis of a difference between a driving feature of the driver and a driving feature of the passenger.

BRIEF DESCRIPTION OF THE DRAWINGS

FIG. 3 is a flowchart illustrating processing performed in the driving advice system according to the present example.

DETAILED DESCRIPTION

Figure 1:
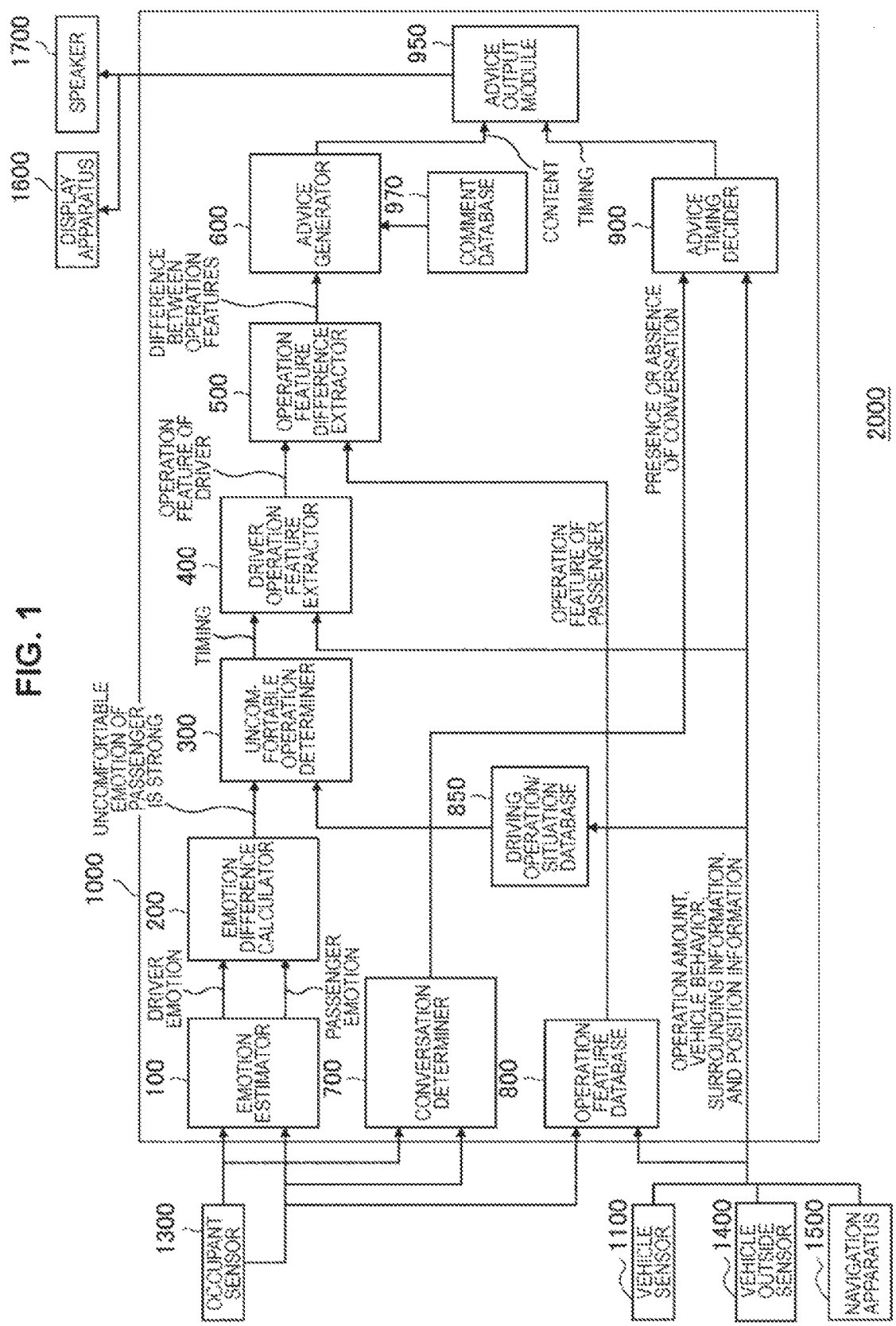
FIG. 1 is a schematic diagram illustrating a configuration of a driving advice system according to an example of the present invention.

Hereinafter, preferred examples of the present invention will be described in detail with reference to the appended drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following examples which are not recited in a most-generic independent claim of the disclosure are optional and may be provided on an as-needed basis. The drawings are schematic and are not intended to be drawn to scale. In this specification and the appended drawings, structural elements that have substantially the same function and structure are denoted with the same reference numerals, and repeated description of these structural elements is omitted.

The technology described in JP-A No. 2009-157685, JP-A No. 2013-69251, and JP-A No. 2006-350567 takes nothing into consideration about offering driving advice in which an emotion of a passenger is reflected. Therefore, there is a problem that a driving operation with which a passenger feels uncomfortable is not improved.

In addition, the technology described in JP-A No. 2016-137871 does not encourage a driving operation of a driver to be improved to reflect an emotion of a passenger. Therefore, there is a problem that a driving operation of a driver with which a passenger feels uncomfortable continues. In addition, the technology described in JP-A No. 2016-137871 improves a negative emotion by performing various kinds of control on a vehicle side. Accordingly, there is a problem that a driving operation which makes a passenger uncomfortable is performed when a vehicle that is not equipped with the driving control apparatus is driven.

It is desirable to provide a novel and improved driving advice apparatus and driving advice method that can achieve driving which does not make a passenger uncomfortable.

FIG. 1 is a schematic diagram illustrating the configuration of a driving advice system 2000 according to an example of the present invention. The driving advice system 2000 includes a driving advice apparatus 1000, a vehicle sensor 1100, an occupant sensor 1300, a vehicle outside sensor 1400, a navigation apparatus 1500, a display apparatus 1600, and a speaker 1700. The driving advice system 2000 is chiefly mounted on a vehicle.

The vehicle sensor 1100 includes a variety of sensors that detect vehicle information such as the speed of a vehicle, the acceleration of a vehicle, the angular velocity of an axle (such as a drive shaft), and steering angular velocity (steering angle acceleration). In addition, the vehicle sensor 1100 includes a sensor that detects the stepping amount, the stepping angle, the stepping force, or the like of an accelerator pedal or a brake pedal, and a sensor that detects the steering angle of a steering wheel.

The occupant sensor 1300 includes a camera, an infrared sensor and the like, and detects the face of an occupant of a vehicle. In addition, the occupant sensor 1300 measures the movement of the head or an arm, the line-of-sight direction, or the like of an occupant. When the occupant sensor 1300 includes a camera, applying image processing to an image captured by the camera causes the face of an occupant, the movement of the head or an arm of an occupant, the line-of-sight direction or the like to be acquired. In addition, the occupant sensor 1300 includes a microphone that acquires audio data of speech of an occupant.

The vehicle outside sensor 1400 includes a stereo camera, a monocular camera, a millimeter-wave radar, an infrared sensor and the like, and measures the positions or speed of people, vehicles, and the like in the vicinity of the vehicle equipped with the vehicle outside sensor 1400. When the vehicle outside sensor 1400 includes a stereo camera, the stereo camera includes a pair of right and left cameras including image sensors such as CCD sensors and CMOS sensors. The vehicle outside sensor 1400 images an external environment outside the vehicle, and sends image information obtained by performing imaging, or the distance to another vehicle extracted from the image information, speed, sign information or the like to the driving advice apparatus 1000. As an instance, the stereo camera includes a color camera capable of acquiring color information, and is installed on the upper part of the windshield of the vehicle.

The navigation apparatus 1500 searches for a route from the current location to a destination on the basis of map information. Therefore, the navigation apparatus 1500 can acquire the current position of the vehicle by using the global positioning system (GPS) and the like. In addition, the navigation apparatus 1500 stores the route taken by the vehicle to the current location.

The display apparatus 1600 displays advice for a driver output from the driving advice apparatus 1000. The speaker 1700 outputs the advice for a driver output by the driving advice apparatus 1000 by voice.

As illustrated in FIG. 1, the driving advice apparatus 1000 includes an emotion estimator 100, an emotion difference calculator 200, an uncomfortable operation determiner 300, a driver operation feature extractor 400, an operation feature difference extractor 500, an advice generator 600, a conversation determiner 700, an operation feature database 800, an advice timing decider 900, and an advice output module 950.

Note that each of the components of the driving advice apparatus 1000 illustrated in FIG. 1 can include a circuit (hardware) or a central processing unit such as a CPU, and a program (software) for bringing it into operation.

The emotion estimator 100 estimates an emotion of an occupant (driver or passenger) of the vehicle. In general, it is known that there is correlation between a human emotion and a facial feature amount (Facial Action Coding System). This correlation is used to accumulate the relationship between emotions and facial feature amounts in a database in advance. The emotion estimator 100 acquires a facial feature amount from an image of a camera or the like, and makes a comparison with the relationship in the database to estimate an emotion of an occupant.

Figure 2:
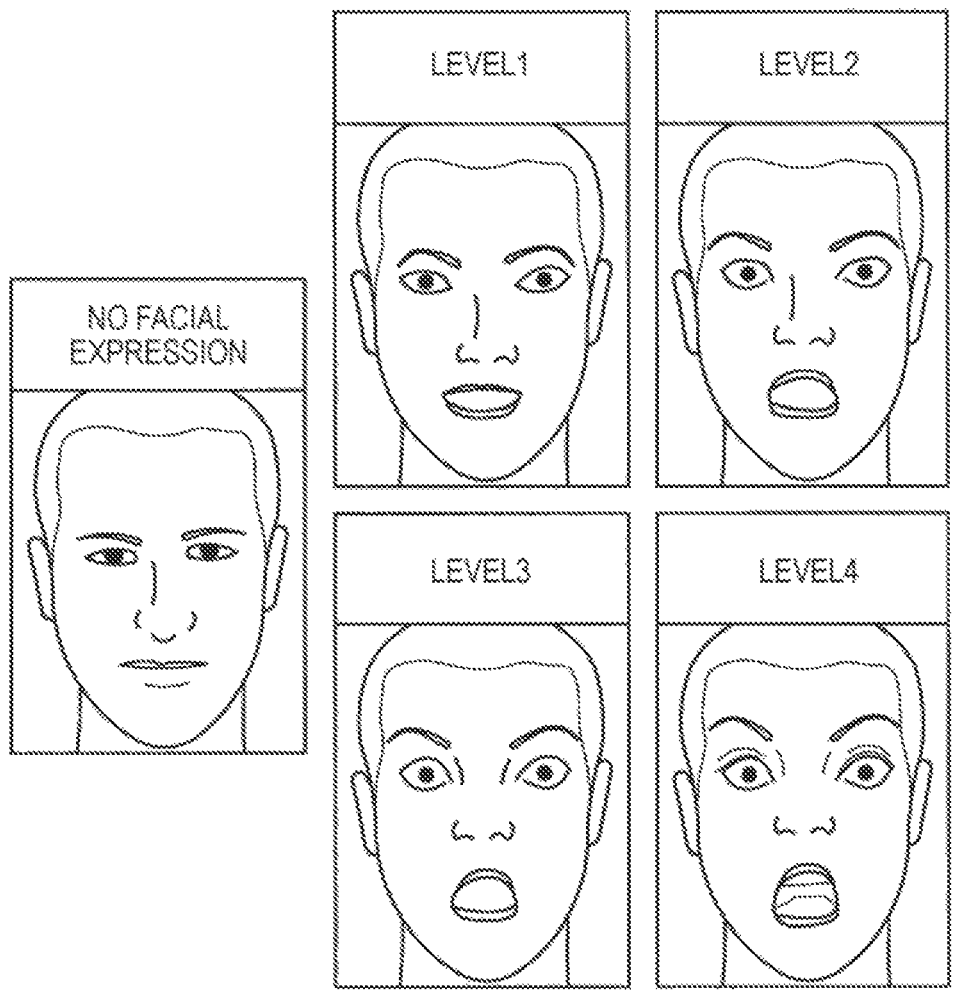
FIG. 2 is a schematic diagram illustrating a technique of allowing an emotion estimator to estimate an emotion on the basis of a face image for which an emotion referred to as "scared" is defined in advance.

FIG. 2 is a schematic diagram illustrating a technique of allowing the emotion estimator 100 to estimate an emotion on the basis of a face image for which an emotion referred to as "scared" is defined in advance. As illustrated in FIG. 2, feature amounts acquired from image information of facial expressions and the emotions (levels 1 to 4) corresponding to the respective feature amounts are held in the database included in the driving advice apparatus 1000 in advance in association with each other. The emotion estimator 100 compares a feature amount acquired from image information of the face of an occupant acquired from the occupant sensor 1300 with the feature amounts of the image information held in advance and illustrated in FIG. 2, extracts the feature amount of the image information which has a high degree of similarity to the feature amount of the image information of the occupant from among the feature amounts corresponding to the image information illustrated in FIG. 2, and determines an emotion of the occupant on the basis of the level corresponding to the extracted feature amount of the image information. In addition, the image information of the face of the occupant acquired from the occupant sensor 1300 with a method such as block matching may be compared with the image information of the occupant as illustrated in FIG. 2 which is held in advance, the feature amount of the image information which has great similarity to the image information of the occupant may be extracted from among the image information illustrated in FIG. 2, and an emotion of the occupant may be determined. Note that FIG. 2 exemplifies the emotion of "scared" with four levels. The same applies to emotions such as "surprised," "impatient," and "rushed." The feature amounts corresponding to image information of facial expressions are categorized into levels in association with the emotions corresponding to the respective feature amounts, thereby making it possible to determine the type and level of an emotion. It is also possible to use, for instance, the technique described in JP-A No. 2013-216241 to estimate an emotion.

In addition, FIG. 2 exemplifies the emotion of "scared" with four levels, but the emotion may be categorized into more detailed levels such as eight levels. In addition, for instance, the emotion of "scared" may be categorized into the binary levels of "scared" and "not scared."

In addition, the emotion estimator 100 may estimate an emotion of an occupant on the basis of audio data of the occupant acquired by a microphone included in the occupant sensor 1300. In this case, for instance, a pattern of change in the feature amount of the audio data is categorized on the basis of a change pattern categorized into classes, the categorized audio data are used as teacher data, and an emotion of a speaker at the time of speech is estimated for each change pattern of a feature amount. As such a technique, for instance, the technique described in JP-A No. 2017-111760 can be used.

The emotion difference calculator 200 calculates a difference between an emotion of a driver and an emotion of a passenger. The emotion difference calculator 200 can perform different processing in accordance with whether information of an emotion estimated by the emotion estimator 100 is binary information or multivalued information categorized into levels. If information of an emotion estimated by the emotion estimator 100 is any of the two values of "scared" and "not scared," the emotion difference calculator 200 compares an emotion of a driver with an emotion of a passenger, and sets an "uncomfortable operation feature flag" when the driver does not feel uncomfortable (emotions such as "frightened," "surprised," "impatient," and "rushed"), and the passenger feels uncomfortable.

In addition, when the emotion estimator 100 categorizes information of an emotion of an occupant into levels as illustrated in FIG. 2, the emotion difference calculator 200 can calculate a difference in the way of feeling between a driver and a passenger even if both of them feel the emotion of "scared." For instance, when the driver feels the emotion of "scared" at a level 2 and the passenger feels the emotion of "scared" at a level 8, a level difference in the emotion of "scared" corresponds to 8−2=6. The emotion difference calculator 200 sets an "uncomfortable operation feature flag" when this level difference is greater than or equal to a constant threshold. Note that the threshold is a positive value. "Level difference is greater than or equal to a constant threshold" described above means a situation in which a passenger feels the emotion of "scared" more strongly.

Note that, when there are passengers, as a target whose difference in emotion from a driver is evaluated, a target having the highest priority among modes prioritized on the basis of a passenger who has the highest uncomfortableness level, an individual who is identified in advance, or a sitting position is taken to be selected.

The uncomfortable operation determiner 300 determines a driving operation that makes a passenger uncomfortable. Once the emotion difference calculator 200 sets an "uncomfortable operation feature flag," the uncomfortable operation determiner 300 analyzes vehicle data, data of an operation amount, data of a surrounding situation of the vehicle and the like within a predetermined time (e.g. several seconds) before and after the time when the flag is set, and checks any change in the driving operation of the driver or the surrounding situation of the vehicle. Here, the time when the passenger feels uncomfortable, the time when the driving operation that causes the emotion occurs, or the time when the surrounding situation that causes the emotion occurs does not necessarily agree. Accordingly, both data before and after the time when the flag is set are also analyzed. For instance, when a passenger feels scared of a sudden acceleration operation of a driver, an operation (stepping on the accelerator) of the driver is performed before the time when an emotion of the passenger changes (steady→scared). Meanwhile, when the passenger feels scared because a brake operation of the driver is slow, an operation (stepping on the brake) of the driver is performed after the time when an emotion of the passenger changes (steady→scared). Thus, analyzing both data before and after the time when the flag is set makes it possible to identify the driving operation and the surrounding situation corresponding to an emotion of the passenger who feels "scared."

Examples of data to be analyzed include data regarding an operation amount for driving the vehicle, data regarding vehicle behavior, data regarding the position of the vehicle, and data regarding vehicle outside information.

Examples of data regarding an operation amount for driving the vehicle include the stepping amount, the stepping angle or the stepping force of the accelerator pedal or the brake pedal, or the steering angle of the steering wheel. These operation amounts are acquired from the vehicle sensor 1100. Examples of data regarding vehicle behavior include vehicle speed, triaxial acceleration, jerk, and angular velocity. These data are acquired from the vehicle sensor 1100. Examples of data regarding the position of the vehicle include position information of the vehicle, and map information regarding the area in the vicinity of the vehicle. These data are acquired from the navigation apparatus 1500. Examples of vehicle outside information include the distance and positional relationship to and with a vehicle or a pedestrian in the surroundings, a road sign, and a section line. These kinds of information are acquired from the vehicle outside sensor 1400. A driving operation/situation database 850 included in the driving advice apparatus 1000 accumulates these data in chronological order. The uncomfortable operation determiner 300 uses these data accumulated in the driving operation/situation database 850 to determine a driving operation that makes a passenger uncomfortable, or a vehicle surrounding situation that makes a passenger uncomfortable.

When a driving operation of a driver changes within the predetermined time before and after the time when an "uncomfortable operation feature flag" is set as a result of data analysis, the uncomfortable operation determiner 300 determines that that operation causes the "uncomfortable operation feature flag" to occur. As a method for determining change, a determination is taken to be made from an operation amount and a changing time. For instance, with regard to an accelerator operation or a brake operation, when "a state in which no operation is performed transitions to an operation state," or "an operation is being performed, but an accelerator or brake opening degree changes by a predetermined value or more within a unit time," it is determined that a driving operation of a driver changes.

The uncomfortable operation determiner 300 determines whether a driving operation changes, and then transitions to "determine a surrounding situation." Examples of a driving operation that makes a passenger uncomfortable except for change in the driving operation such as sudden braking or sudden accelerating described above include a driver not traveling in a way suitable for the surrounding situation (such as a traffic rule or a manner). That is, when the "determination of the surrounding situation" of the driver is inappropriate, a driving operation that makes a passenger uncomfortable is performed.

Examples include a situation in which the vehicle is traveling at constant speed, but has an extremely short inter-vehicle distance to a preceding vehicle ahead of the vehicle (situation of so-called tailgating) and a situation in which the vehicle exceeds legal speed. Even if the "change in the driving operation" described above is not recognized, the uncomfortable operation determiner 300 determines that this driving operation is a driving operation which makes a passenger uncomfortable just because the "determination of the surrounding situation" is inappropriate.

When making a "determination of the surrounding situation," the uncomfortable operation determiner 300 can apply the principle of triangulation to a pair of right and left stereo images captured by the pair of right and left cameras of the stereo camera included in the vehicle outside sensor 1400 to generate and acquire distance information to a target from the amount of discrepancy between the corresponding positions. At the same time, the uncomfortable operation determiner 300 can acquire position information of an object from image information. In addition, the uncomfortable operation determiner 300 can detect three-dimensional object data, lane line data, and the like by performing well-known grouping processing on the distance information generated on the basis of the principle of triangulation, and then comparing the distance information subjected to the grouping processing with preset three-dimensional object data and the like. This allows the uncomfortable operation determiner 300 to recognize a person, another vehicle, a stop sign, a stop line, an ETC gate, and the like. In addition, the uncomfortable operation determiner 300 can recognize that the vehicle exceeds legal speed on the basis of the speed of the vehicle acquired from the vehicle sensor 1100. Thus, the uncomfortable operation determiner 300 can make a "determination of the surrounding situation" on the basis of the recognized information.

When the "change in the driving operation" is not recognized, and the "determination of the surrounding situation" is correct, the uncomfortable operation determiner 300 determines that the passenger is made uncomfortable because of a reason other than the driving operation. In this case, the series of processing from the emotion estimator 100 is performed again. Note that examples of the situation in which a passenger feels uncomfortable, but the "change in the driving operation" is not recognized, and the "determination of the surrounding situation is correct include a scene in which only the passenger operates his or her smartphone, and is surprised at information acquired therefrom.

Once the uncomfortable operation determiner 300 identifies a driving operation that makes a passenger uncomfortable ("change in the driving operation" or "determination of the surrounding situation") according to the processing above, the driver operation feature extractor 400 extracts a "feature of the driving operation of the driver" from the "change in the driving operation" or the "determination of the surrounding situation."

Examples of a "feature of the driving operation of the driver" include a "feature of acceleration and deceleration" and a "feature of steering." Examples of a "feature of acceleration and deceleration" include "inter-vehicle distance while the vehicle is traveling" and a "traveling time elapsed from a brake operation to a stop of the vehicle." The "inter-vehicle distance while the vehicle is traveling" is the inter-vehicle distance to a front vehicle when the vehicle is positioned in inter-vehicle distance shorter than or equal to a constant value. In addition, the "traveling time elapsed from a brake operation to a stop of the vehicle" is a traveling time elapsed from a start of a brake operation to a stop of the vehicle.

In addition, examples of a "feature of steering" include a "necessary time for changing lanes" or "steering speed for turning right or left" (average steering angular velocity within a predetermined time elapsed since the vehicle enters an intersection and the steering is started to be turned). The "necessary time for changing lanes" is a time elapsed from the time when steering is started to change lanes to the time when the vehicle moves to the next lane and the steering is returned to the center. In addition, the "necessary time for changing lanes" is a time elapsed from the time when, in the case of changing lanes around a curve, steering is started to change lanes to the time when the steering is returned to the appropriate steering angle corresponding to the curvature of the curve. In addition, the "steering speed for turning right or left" is average steering angular velocity within a predetermined time elapsed since the vehicle enters an intersection and the steering is started to be turned.

Note that the "surrounding situation" in which these features are imparted to the feature amount as a label. Examples of a label imparted as a "surrounding situation" include "stopping at a red traffic light" and "turning right at an intersection."

The operation feature database 800 acquires and accumulates a "feature of a driving operation of a passenger." Examples of a "feature of a driving operation of a passenger" include a "feature of acceleration and deceleration" and a "feature of steering" similarly to a "feature of a driving operation of a driver." The feature amount of a driving operation of a passenger is extracted in advance via the vehicle or an equivalent feature amount extraction system. Note that, when a "feature of a driving operation of a passenger" is not acquired, a "model driving operation feature" may be used instead. The "model driving operation feature" may be set by a vehicle manufacturer, or may include the feature amounts of a large number of users acquired from telematics or the like.

The operation feature difference extractor 500 extracts a different point between a driving operation of a driver and a driving operation of a passenger. Specifically, the operation feature difference extractor 500 compares a "feature of a driving operation of a driver" extracted by the driver operation feature extractor 400 with a "feature of a driving operation of a passenger" acquired in advance and accumulated in the operation feature database 800 to extract a difference between both.

A difference between feature amounts is extracted by selecting a "feature of a driving operation of a driver" and a "feature of a driving operation of a passenger" provided with the same labels, and obtaining a difference between values (=feature amount of driving operation of driver–feature amount of driving operation of passenger).

For instance, when a passenger feels uncomfortable with a brake operation of a driver to stop at a traffic light, a difference between the driver and the passenger is obtained with respect to the "traveling time elapsed from a brake operation to a stop of the vehicle" provided with the label "stopping at a red traffic signal." For instance, if the "traveling time elapsed from a brake operation to a stop of the vehicle" of the passenger is an average of 6 seconds and that of the driver is 3 seconds this time, a difference between the driver and the passenger is 3−6=−3 seconds.

The advice generator 600 decides drive assist content for a driver. The advice generator 600 decides a comment for outputting advice such that a difference between the feature amount of a "feature of a driving operation of a driver" and the feature amount of a "feature of a driving operation of a passenger" disappears. Specifically, a "label," a "feature amount," a "sign of a difference," and an "absolute value of a difference" are used as inputs, and a comment is created with a comment creation map.

For instance, in the case of the above-described instance, the "label (=stopping at a red traffic light)," the "feature amount (=traveling time elapsed from a brake operation to a stop of the vehicle)," the "sign of a difference (=negative)," and the "absolute value of a difference (=3 seconds)" are input to create a comment for a driver such as "It is recommended to set the 'time' for a 'brake operation' as 'early' when you 'stop at a red traffic light.' Specifically, approximately 'three seconds' before is appropriate."

A database 970 included in the driving advice apparatus 1000 stores, in advance, comments corresponding to inputs such as a "label," a "feature amount," a "sign of a difference," and an "absolute value of a difference." The advice generator 600 extracts the comments corresponding to these inputs from the comment database 970 to create a comment.

The advice timing decider 900 decides the timing at which advice generated by the advice generator 600 is transmitted to a driver. Here, if advice is transmitted at wrong timing, the advice is not correctly transmitted to a driver, and what is worse, the advice can make an occupant even uncomfortable. Therefore, the advice timing decider 900 categorizes advice into advice that needs to be immediately transmitted and advice that should be transmitted after the situation is determined, and transmits advice at appropriate timing.

First, it is advice directly associated with danger that requires immediacy. For instance, immediacy is required when a driver ignores a stop sign or exceeds a speed limit. Meanwhile, a large traveling load or conversation with an occupant can require appropriate timing to be watched. For instance, when a driver is performing a sudden brake operation, it is not preferable as the timing at which advice is transmitted. Accordingly, after a steady traveling state (such as a situation in which an operation is constant and position information shows that the vehicle is traveling straight) is entered, the driver is advised.

It is possible to determine whether the state is dangerous on the basis of the "determination of the surrounding situation" described above. In addition, it is possible to determine the traveling load from a function of extracting a "feature of a driving operation."

In addition, it is possible to determine from the voice of an occupant whether a driver is conversing. The conversation determiner 700 determines whether conversation is carried out in accordance with the speech of an occupant acquired from the microphone of the occupant sensor 1300.

The advice output module 950 outputs advice generated by the advice generator 600 at timing decided by the advice timing decider 900. The output advice is displayed on the display apparatus 1600. In addition, the output advice is pronounced by voice from the speaker 1700.

As described above, offering driving advice for a driving operation feature with which a passenger feels uncomfortable makes it possible to fundamentally improve a driving operation of a driver with which a passenger feels uncomfortable. In addition, a passenger does not have to directly offer a driver advice or a driving instruction, and thus it is also possible to prevent the passenger and the driver from quarreling.

FIG. 3 is a flowchart illustrating processing performed in the driving advice system 2000 according to the present example. First, in step S10, when the vehicle is started to be driven, the occupant sensor 1300 identifies an occupant. In next step S12, the emotion estimator 100 estimates an emotion of the occupant on the basis of a facial expression or voice of the occupant acquired from the occupant sensor 1300.

In next step S14, the emotion difference calculator 200 calculates a difference between an emotion of a driver and an emotion of a passenger. In next step S16, the emotion difference calculator 200 determines on the basis of a difference between an emotion of the driver and an emotion of the passenger whether the passenger feels uncomfortable strongly. If the emotion difference calculator 200 determines that the passenger feels uncomfortable strongly, the emotion difference calculator 200 sets an "uncomfortable operation feature flag" and the flow proceeds to step S18. In contrast, it is determined in step S16 that the passenger does not feel uncomfortable strongly, the flow returns to step S12.

Once the emotion difference calculator 200 sets an "uncomfortable operation feature flag," the uncomfortable operation determiner 300 determines, in step S18, a driving operation that makes the passenger uncomfortable. In next step S20, the driver operation feature extractor 400 extracts a feature of a driving operation of the driver.

In next step S22, the operation feature difference extractor 500 extracts a difference between an operation feature of the driver and an operation feature of the passenger. In next step S24, it is determined whether there is any difference between the operation feature of the driver and the operation feature of the passenger. If there is any difference between the operation feature of the driver and the operation feature of the passenger, the flow proceeds to step S26. In contrast, if there is no difference between the operation feature of the driver and the operation feature of the passenger, the flow returns to step S12.

In step S26, the advice generator 600 generates a comment for outputting advice for the driver. In next step S28, the advice timing decider 900 determines whether the timing at which advice is transmitted to the driver is appropriate. If the timing at which advice is transmitted to the driver is appropriate, the flow proceeds to step S30. In contrast, it is determined in step S28 that the timing at which advice is transmitted to the driver is not appropriate, the flow returns to step S28.

In step S30, the advice output module 950 outputs advice generated by the advice generator 600. In next step S34, it is determined whether the driving of the vehicle continues. If the driving of the vehicle continues, the flow returns to step S12. In contrast, if the driving of the vehicle does not continue, the processing is terminated (END).

According to the present example as described above, a driving operation that makes a passenger feels uncomfortable is determined on the basis of the timing at which a difference occurs between an emotion of a driver and an emotion of the passenger. Advice for a driver about the determined driving operation is generated on the basis of the difference between the driver and the passenger. This makes it possible to prevent the driving with which a passenger feels uncomfortable from being performed.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A driving advice apparatus comprising:
   a processor configured to:
   use a difference between an emotion of a driver and an emotion of a passenger to determine that the passenger feels more uncomfortable than the driver;
   determine a specific driving operation of the driver that causes the passenger to feel more uncomfortable than the driver;
   identify a driving feature of the driver associated with the specific driving operation of the driver;
   retrieve, from a database, a driving feature of the passenger indicating the passenger's driving behavior when the passenger is in the driver's position; and
   generate an advice for the driver about the specific driving operation on a basis of a difference between the identified driving feature of the driver and the retrieved driving feature of the passenger.

2. The driving advice apparatus according to claim 1, wherein the processor is configured to estimate an emotion of an occupant; and
   an emotion difference calculator configured to calculate a difference between an emotion of the driver and an emotion of the passenger on a basis of the emotion of the driver and the emotion of the passenger which are estimated by the processor.

3. The driving advice apparatus according to claim 1, wherein
   the processor determines the specific driving operation within a predetermined time before or after a timing at which a difference between an emotion of the driver and an emotion of the passenger occurs.

4. The driving advice apparatus according to claim 2, wherein
   the processor determines the specific driving operation within a predetermined time before or after a timing at which a difference between an emotion of the driver and an emotion of the passenger occurs.

5. The driving advice apparatus according to claim 3, wherein
   when a driving operation of the driver changes within the predetermined time, the processor determines the driving operation as the specific driving operation.

6. The driving advice apparatus according to claim 4, wherein
when a driving operation of the driver changes within the predetermined time, the processor determines the driving operation as the specific driving operation.

7. The driving advice apparatus according to claim 3, wherein
the processor determines the specific driving operation on a basis of a situation in a vicinity of a vehicle within the predetermined time.

8. The driving advice apparatus according to claim 4, wherein
the processor determines the specific driving operation on a basis of a situation in a vicinity of a vehicle within the predetermined time.

9. The driving advice apparatus according to claim 1, wherein the processor is configured to extract the driving feature of the driver on a basis of the specific driving operation.

10. The driving advice apparatus according to claim 2, wherein the processor is
configured to extract the driving feature of the driver on a basis of the specific driving operation.

11. The driving advice apparatus according to claim 9, wherein
the database is configured to store a plurality of driving features of the passenger;
wherein the retrieved driving feature of the passenger corresponds to the identified driving feature of the driver, and wherein the processor extracts the difference between the identified driving feature of the driver and the retrieved driving feature of the passenger.

12. The driving advice apparatus according to claim 10, wherein
the database is configured to store a plurality of driving features of the passenger;
wherein the retrieved driving feature of the passenger corresponds to the identified driving feature of the driver, and wherein the processor extracts the difference between the identified driving feature of the driver and the retrieved driving feature of the passenger.

13. The driving advice apparatus according to claim 11, wherein
the processor extracts the driving feature of the passenger corresponding to the driving feature of the driver from the database on a basis of a label indicating a driving state at a time when a driving feature of the driver is extracted.

14. The driving advice apparatus according to claim 12, wherein
the processor extracts the driving feature of the passenger corresponding to the driving feature of the driver from the database on a basis of a label indicating a driving state at a time when a driving feature of the driver is extracted.

15. The driving advice apparatus according to claim 1, wherein the processor is configured to decide a timing at which the advice is output; and output the advice at the timing decided by the processor.

16. The driving advice apparatus according to claim 2, wherein the processor is configured to decide a timing at which the advice is output; and output the advice at the timing decided by the processor.

17. A driving advice method comprising:
using a difference between an emotion of a driver and an emotion of a passenger to determine that the passenger feels more uncomfortable than the driver;
determining a specific driving operation of the driver that causes the passenger to feel more uncomfortable than the driver;
identifying a driving feature of the driver associated with the specific driving operation of the driver;
retrieving, from a database, a driving feature of the passenger indicating the passenger's driving behavior when the passenger is in the driver's position; and
generating an advice for the driver about the specific driving operation on a basis of a difference between the identified driving feature of the driver and the retrieved driving feature of the passenger.

18. A driving advice apparatus comprising:
a circuit configured to
use a difference between an emotion of a driver and an emotion of a passenger to determine that the passenger feels more uncomfortable than the driver;
determine a specific driving operation of the driver that causes the passenger to feel more uncomfortable than the driver;
identify a driving feature of the driver associated with the specific driving operation of the driver;
retrieve, from a database, a driving feature of the passenger indicating the passenger's driving behavior when the passenger is in the driver's position; and
generate an advice for the driver about the specific driving operation on a basis of a difference between the identified driving feature of the driver and the retrieved driving feature of the passenger.

* * * * *